(12) United States Patent
Hayashi et al.

(10) Patent No.: US 7,542,948 B2
(45) Date of Patent: Jun. 2, 2009

(54) GENETIC DESIGN METHOD AND APPARATUS

(75) Inventors: Kikuo Hayashi, Torrance, CA (US); Mark Ashcraft, Redondo Beach, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 96 days.

(21) Appl. No.: 10/649,936

(22) Filed: Aug. 28, 2003

(65) Prior Publication Data

US 2004/0049472 A1    Mar. 11, 2004

Related U.S. Application Data

(63) Continuation of application No. 09/596,575, filed on Jun. 16, 2000, now abandoned.

(30) Foreign Application Priority Data

Jun. 16, 2000    (FR) .......................... 0787

(51) Int. Cl.
    *G06N 3/12*    (2006.01)
(52) U.S. Cl. ...................................... 706/13
(58) Field of Classification Search .................. 706/13; 716/9; 700/121
    See application file for complete search history.

(56) References Cited

U.S. PATENT DOCUMENTS

| | | | |
|---|---|---|---|
| 3,880,499 A * | 4/1975 | Miller ......................... | 359/833 |
| 4,857,902 A | 8/1989 | Naimark et al. | |
| 4,935,877 A | 6/1990 | Koza | |
| 5,136,686 A * | 8/1992 | Koza ........................... | 706/13 |
| 5,148,513 A | 9/1992 | Koza et al. | |
| 5,189,402 A | 2/1993 | Naimark et al. | |
| 5,270,694 A | 12/1993 | Naimark et al. | |
| 5,343,554 A | 8/1994 | Koza et al. | |
| 5,390,282 A | 2/1995 | Koza et al. | |
| 5,448,142 A | 9/1995 | Severson et al. | |
| 5,495,419 A * | 2/1996 | Rostoker et al. ............ | 700/121 |

(Continued)

OTHER PUBLICATIONS

Bentley et al., "Conceptual Evolutionary Design by a Genetic Algorithm", 1996, Engineering Design and Automation 2:3, John Wiley & Sons, Inc.*

(Continued)

*Primary Examiner*—David R Vincent
*Assistant Examiner*—Nathan H Brown, Jr.
(74) *Attorney, Agent, or Firm*—Westerman, Hattori, Daniels & Adrian, LLP.

(57) ABSTRACT

A genetic design method and apparatus in which desired profiles, such as of an automobile, are broken down into concepts, including the local concepts of surface segments and glue segments, and in which a genetic algorithm is used to evolve parent profiles to produce offspring profiles based on merit values of the concepts. The genetic algorithm includes a probabilistic recombination algorithm which selects for each of the attributes of the concepts at least one of a random value and a value of the attribute associated with one of the parent profiles depending on a non-linear importance function based on the merit values. The combination of the merit values, as represented by the non-linear importance function, reflects the preferences of the designer as the design progresses through various modifications and generations of evolution. A family tree is maintained to identify successive generations of the parent and offspring profiles.

33 Claims, 5 Drawing Sheets

U.S. PATENT DOCUMENTS

| | | | | |
|---|---|---|---|---|
| 5,557,533 | A | * | 9/1996 | Koford et al. .................. 716/9 |
| 5,636,125 | A | * | 6/1997 | Rostoker et al. ............ 700/121 |
| 5,742,738 | A | | 4/1998 | Koza et al. |
| 5,815,394 | A | | 9/1998 | Adeli et al. |
| 5,848,402 | A | | 12/1998 | Pao et al. |
| 5,867,397 | A | | 2/1999 | Koza et al. |
| 6,058,385 | A | | 5/2000 | Koza et al. |
| 6,132,108 | A | | 10/2000 | Kashiwamura et al. |
| 6,233,493 | B1 | | 5/2001 | Cherneff et al. |
| 6,249,714 | B1 | | 6/2001 | Hocaoglu et al. |
| 6,356,884 | B1 | | 3/2002 | Thaler |
| 6,408,263 | B1 | | 6/2002 | Summers |
| 6,424,959 | B1 | | 7/2002 | Bennett, III et al. |

OTHER PUBLICATIONS

Jackson et al., The Use Of Automation To Explain Genetic Algorithms, 1997, ACM 0.89791.889-4/97/0002.*

Jones et al., Development and Validation of a Genetic Algorithm for Flexible Docking, 1997, J. Mol. Biol. (1997) 267, 727-748.*

Renner, Geometric Optimization with Genetic Algorithms, 1988, ERCIM News No. 33—Apr. 1998.*

Faccenda et al., A Combined Simulation/Optimization Approach to Process Plant Design, 1992, Proceedings of the 1992 Winter Simulation Conference.*

Bedwell et al., Artificial Evolution of Algebraic Surfaces, 1999, University of Maryland Baltimore County, Department of Computer Science and Electrical Engineering.*

Rowland et al., Evolutionary Co-operative Design Between Human and Computer: Implementation of 'The Genetic Sculpture Park'., 2000, M.I.N.D. Lab, Michigan State University.*

Bentley et al., "Conceptual Evolutionary Design by a Genetic Algorithm", 1996.*

Jones et al., "Development and Validation of a Genetic Algorithm for Flexible Docking", 1997.*

Renner, "Geometric Optimization with Genetic Algorithms", 1998.*

Faccenda et al., "A Combined Simulation/Optimization Approach To Process Plant Design", 1992.*

Bedwell et al., "Artificial Evolution of Algebraic Surfaces", 1999.*

Rowland et al., "Evolutionary Co-operative Design Between Human and Computer: Implementation of 'The Genetic Sculpture Park'.", 2000.*

Fujita et al., Multi-Objective Optimal Design of Automotive Engine Using Genetic Algorithm, Proceedings of the 1998 ASME Design Engineering Technical Conferences, Sep. 1998.

Choi et al., Evaluations of Surfaces for Automobile Body Styling, Proceedings of Computer Graphics International, Jun. 1996, pp. 202-211.

Rowland et al., Evolutionary Co-Operative Design Between Human and Computer: Implementation of 'The Genetic Sculpture Park', Proceedings of the Web 3D-VRML 2000 Fifth Symposium on Virtual Reality Modeling Language, May 2000, pp. 75-77.

Davis et al., Recent Advances in The Modeling, Scheduling and Control of Flexible Automation, Proceedings of the 1993 Winter Simulation Conference, 1993, pp. 143-155.

Lis et al., "VHDL Synthesis Using Structured Modeling", 26th Annual ACM/IEEE Design Automation Conference, 1989, pp. 606-609.

Nguyen et al., "Multiple Object Representations", Proceedings of the 1992 ACM Annual Conference on Communications, 1992, pp. 197-204.

Esbensen et al., "A Performance-Driven IC/MCM Placement Algorithm Featuring Explicit Design Space Exploration", ACM Transactions on Design Automation of Electronic Systems, vol. 2, No. 1, Jan. 1997, pp. 62-80.

* cited by examiner

GENETIC DESIGN METHOD AND APPARATUS

This application is a Continuation of prior application Ser. No. 09/596,575 filed Jun. 16, 2000 now abandoned

BACKGROUND OF THE INVENTION

1. Field of the Invention

The present invention generally relates to a computer-aided design method, and more particularly, to designing concept sketches, such as for automobile profiles, using a genetic algorithm.

2. Description of the Related Art

The conventional design process which involves a "proof of concept" have been accomplished with drawings and subsequent refinements done by hand or with computer assistance. A designer creates concept sketches or profiles, such as for a new automobile, by hand or with a suitable CAD/CAM program. The process may take up to one or two months, or longer, to create acceptable concepts. An average designer may create about twelve sketches a day. Renderings in one-fifth scale may be achieved in less than two days.

Such conventional techniques are time consuming and tedious. In addition, traditional CAD/CAM programs are, for the most part, enhanced drawing tools which merely reflect the designer's creativity but do not generate creative contributions. The conventional approach does not dramatically reduce the cycle time to generate acceptable proofs of concept, such as for a new automobile.

Genetic algorithms have been used in the art to transform an initial population of objects into new populations based on theories of natural selection and survival of the fittest. Starting with an initial population of objects, such genetic algorithms evaluate the objects in the population for fitness with respect to the problem environment and perform genetic operations on various objects in the population to produce a new population. Some basic genetic operations include fitness proportionate reproduction and crossover. Fitness proportionate reproduction reproduces or copies an object from the initial population into the new population based on a probability of fitness for that object in the problem environment. Crossover creates new offspring for the new population by combining relevant parts of two parents. Other genetic operations include mutations or architecture-altering operations.

A detailed discussion of genetic algorithms and genetic operations can be found in U.S. Pat. Nos. 4,935,877; 5,136,686; 5,148,513; 5,343,554; 5,742,738; and the references cited therein. These references show how such genetic algorithms have been specifically tailored for problem solving applications. Genetic algorithms have also been specifically tailored for application in automated design of electrical circuits (see, U.S. Pat. No. 5,867,397) and for application in sound generation (see JP 11-175072). However, the conventional art has not heretofore addressed the problem domain of a design process for concept sketches, such as for new automobiles, for application of a genetic algorithm therein.

SUMMARY OF THE INVENTION

The present invention incorporates a genetic algorithm into a design process, such as for new automobiles, in order to shorten the design cycle, increase productivity, and substantively enhance creativity in the design process.

An object of the present invention is to shorten design development time and to allow a designer to quickly generate high quality concepts or profiles.

It is also an object of the present invention to increase design productivity and quality with a program that learns the designer's preferences and incorporates the designer's preferences in the generation of new offspring profiles.

The present invention achieves these and other objects by providing a genetic design method and apparatus in which parent profiles are selected and broken down into surface segments and glue segments, each of the segments having a length, an height, and an asymmetry attribute, each of the surface segments further having an angle attribute, and each of the glue segments further having a radius attribute; merit values are maintained for each of the segments and for each of the attributes for each of the segments; and offspring profiles are produced by evolving the parent profiles using the merit values.

The genetic algorithm includes a probabilistic recombination algorithm which selects for each of the attributes at least one of a random value and a value of the attribute associated with one of the parent profiles depending on a non-linear importance function based on the merit values.

The merit values include a segment age for each of the segments which measures time, in generations, that the segment continues to exist; a user-set-attribute age for each of the attributes of each of the segments which measures time, in generations, that the attribute having a value set by an user lasts unchanged; a program-defined attribute age for each of the attributes of each of the segments which measures time, in generations, that the attribute having a randomly set value lasts unchanged; a survival time for each of the segments and for each of the attributes of each of the segments which measures time, in generations, that the respective segment and attribute remains unchanged after user modification of a region of the profile including the segment; and a modify time for each of the segments and for each of the attributes of each of the segments which measures frequency of modification of the respective segment and attribute.

By decomposing profiles into segments and evolving such profiles, the present invention can enrich the design process with meaningful offspring profiles reflecting various combinations of preferred characteristics of the parent profiles. This facilitates quick and easy generation of creative concept variations and reduces the overall design time.

Profiles according to the present invention can be easily modified, while maintaining relevant information on the designer's preferences. The combination of the merit values, as represented by the non-linear importance function, reflects the preferences of the designer as the design progresses through various modifications and generations of evolution. Accordingly, the present invention is able to "learn" what is important to the designer as the concept undergoes changes, and the present invention can maintain preferred features across successive generations of the profiles. As such, the genetic design method and apparatus of the present invention enriches the design process with meaningful offspring profiles embodying preferred attributes from prior generations.

The objects of the present invention are also achieved by generating a family tree identifying successive generations of the parent and offspring profiles. By displaying the family tree alongside the parent and offspring profiles, the designer can better appreciate the history of the resulting profile and other design cycle logistics.

Segments of profiles can be aggregated to represent meaningful groupings to facilitate design editing. Profiles can be provided for different views and at different levels of detail. In addition to two-dimensional views of the profiles, combinations of different profile views may be used to create three-dimensional images of the profiles.

BRIEF DESCRIPTION OF THE DRAWINGS

These and other objects and advantages of the invention will become apparent and more readily appreciated from the following description of the preferred embodiment, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings FIGS. 1 to 14.

Figure 1:
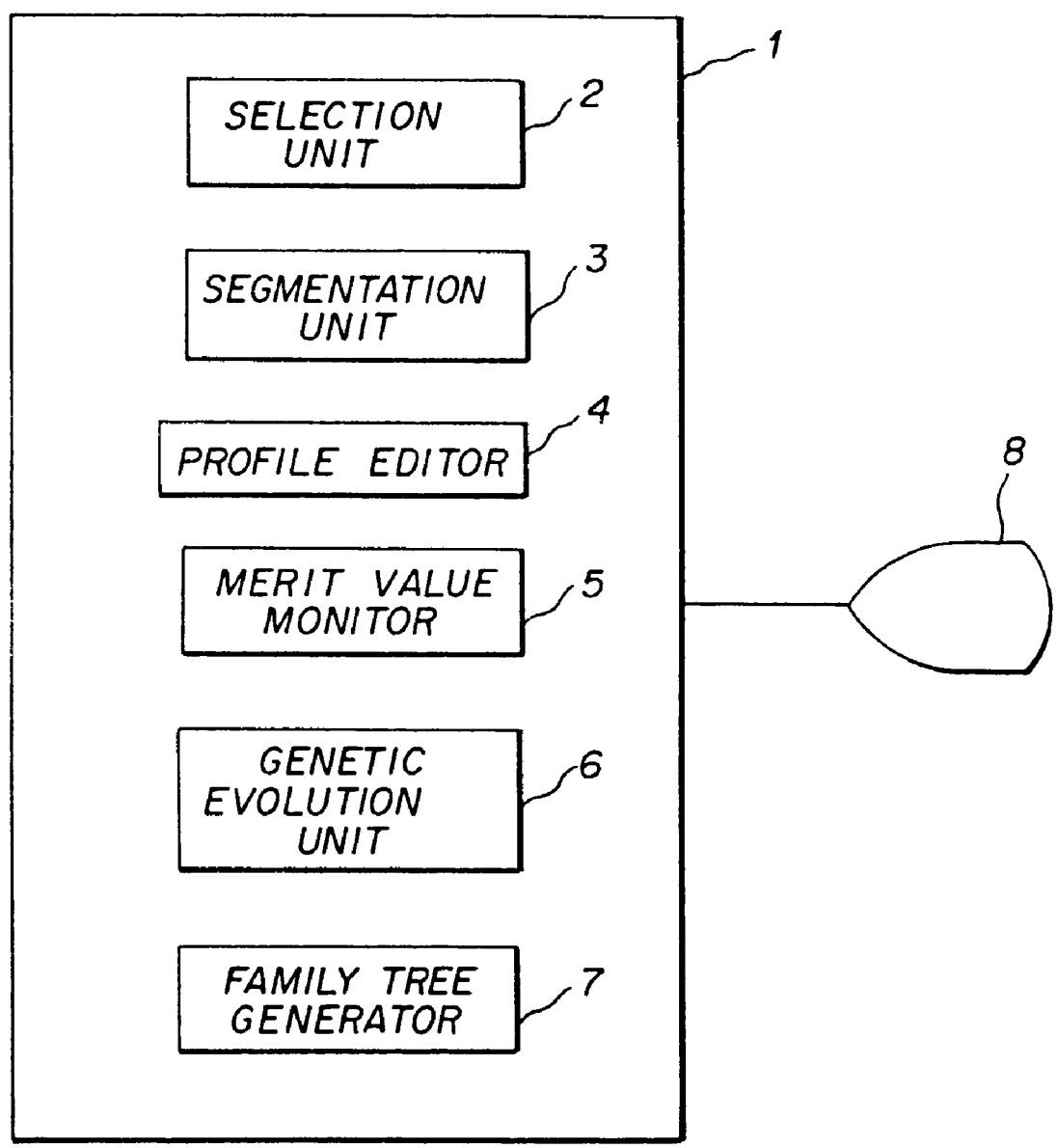
FIG. 1 is a block diagram of a genetic design apparatus according to the present invention.

FIG. 1 is a block diagram of a genetic design apparatus according to the present invention. A computer 1 includes programmed components, such as a selection unit 2, a segmentation unit 3, a profile editor 4, a merit value monitor 5, a genetic evolution unit 6, and a family tree generator 7. Output is displayed on a display 8. The computer 1 may be a general purpose computer, a dedicated processor, a distributed server, a microprocessor, or the like, which may be programmed with the above components.

Figure 2:
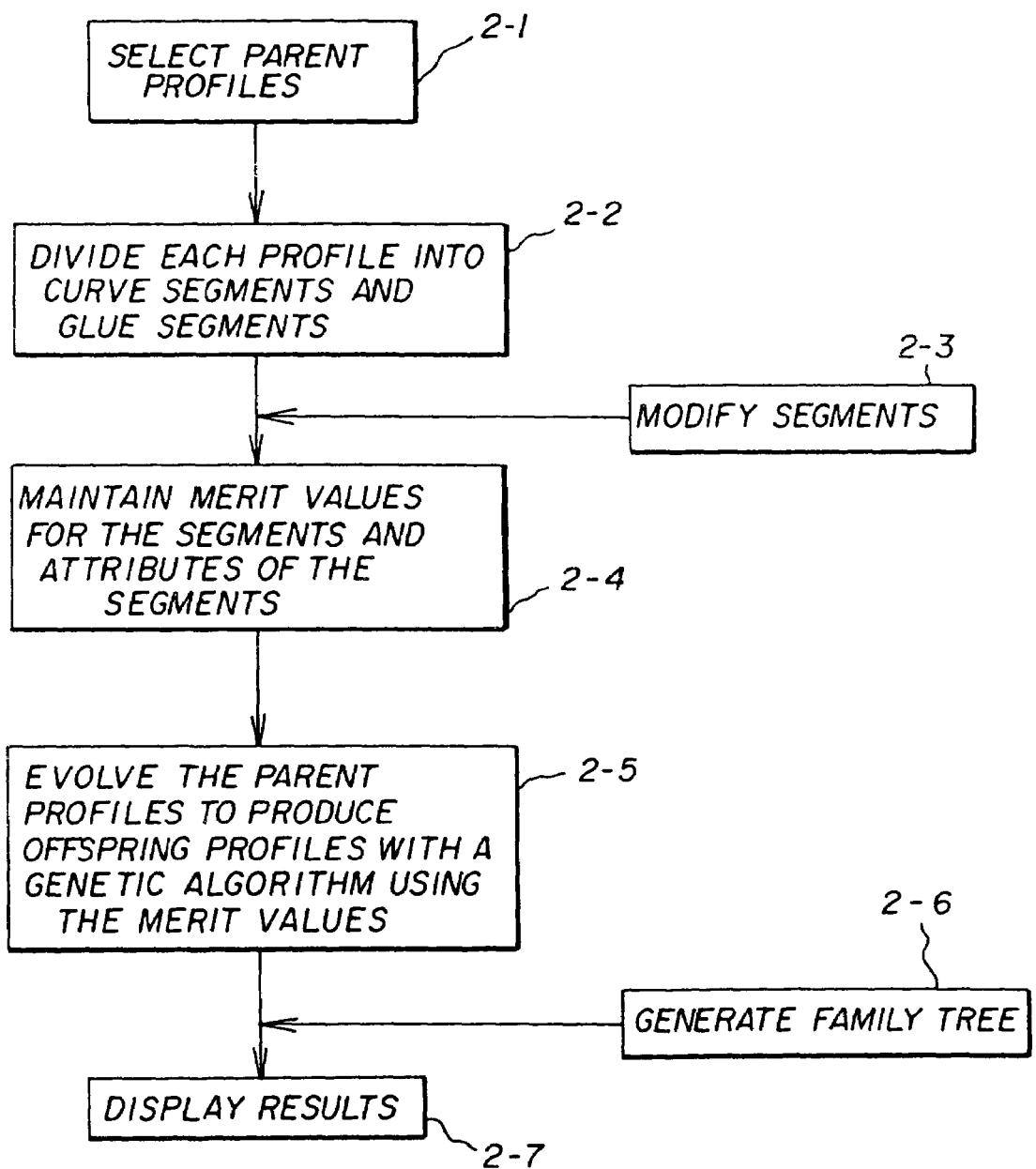
FIG. 2 is a block diagram of a genetic design method according to the present invention.
Figure 3A:
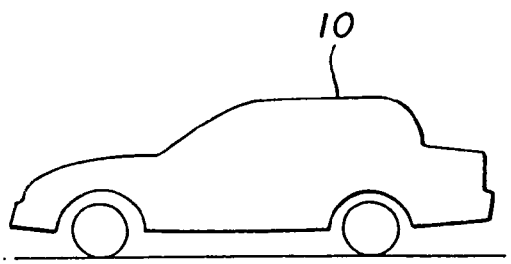
FIGS. 3A and 3B are two parent profiles.
Figure 3B:
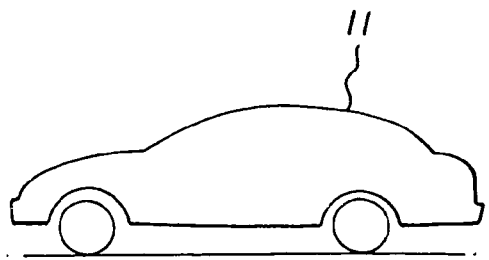

FIG. 2 is a block diagram of a genetic design method according to the present invention. At step 2-1 parent profiles are selected. This selection is managed by the selection unit 2. In the present invention, these profiles preferably represent concept sketches of an automobile. For example, FIGS. 3A and 3B depict parent profiles 10 and 11 which represent outlines of an automobile.

Figure 4:
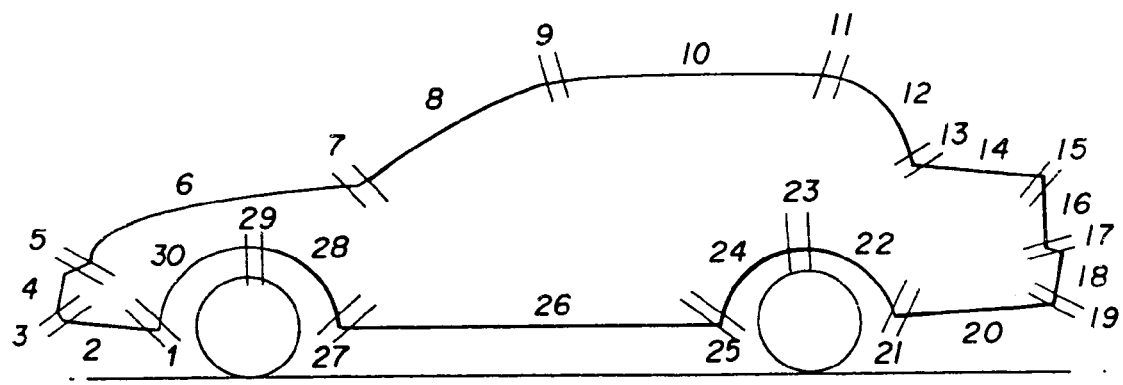
FIG. 4 shows curve and glue segments of the parent profile of FIG. 3A.

After parent profiles are selected, step 2-2 divides each profile into elementary pieces of curves called segments, genes, or local concepts. Each segment is either a surface segment or a glue segment. Glue segments determine the shape of the curve at a boundary between adjacent surface segments, serving to "glue" them together. For example, FIG. 4 shows the curve and glue segments of the parent profile of FIG. 3A. In this example, the profile of FIG. 3A is broken down into 30 segments, numbered 1-30. The even numbers identify surface segments. The odd numbers identify glue segments. A complete series of such segments or genes constitutes a genome of the profile. The partitioning of the profile into segments is performed by the segmentation unit 3.

Figure 5A:
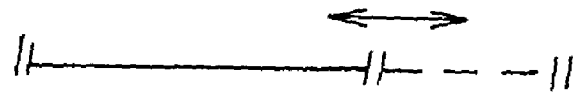
FIGS. 5A to 5C respectively depict length, height, and asymmetry attributes of segments.
Figure 5B:
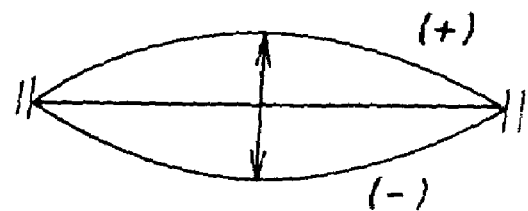
Figure 5C:
Figure 5D:
FIG. 5D depicts the further angle attribute of a surface segment.
Figure 6A:
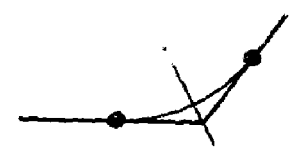
FIGS. 6A and 6B respectively show a tight radius and an open radius for a glue segment.
Figure 6B:
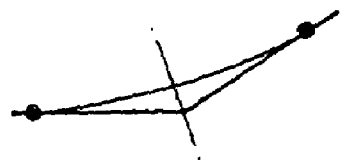

The segments are B-spline curves which are characterized by length, height, and asymmetry attributes. Surface segments also have an angle attribute. Glue segments further include a tight or open radius attribute. FIGS. 5A to 5C respectively depict length, height, and asymmetry attributes common to all segments. FIG. 5D depicts the angle attribute for a surface segment. FIGS. 6A and 6B respectively show a tight radius and an open radius attribute that is unique for a glue segment. The arrows in FIGS. 5A to 5D show how these attributes may be modified by a designer in step 2-3, handled by the profile editor 4. The profile editor may include the use of icons to make changes graphically and dialog menus in which specific values may be entered. Details of how attributes are changed are discussed later.

To facilitate design and modeling, groupings of segments or local concepts may be made to identify higher level concepts. For example, the segments identifying a windshield, a roof, and a rear window may be aggregated to form a higher level concept of a green house. Such higher level concept groupings may be defined and stored in a database used by the computer 1 for further evaluation and editing.

The discussion thus far has referred to the elementary building block curves of a profile as segments, genes, or local concepts. However, global concepts can also be defined for a profile. Global concepts are concerned with the overall aspect of the structure, in ways that cannot be simply controlled with the manipulation of local concepts. For instance, in the green house above, a global concept is the relationship between the windshield angle and the length of the roof. Another global concept is a ratio between the hood and the trunk. Defining such global concepts allow easy tracking and control over desired relationships whenever attributes of segments included in the global concept are changed. For example, changing the length of the roof may change the windshield angle, unless controlled by a global concept on the relationship. As with the higher level concept groupings, such global concepts may also be defined and stored in a database used by the computer 1 for further consideration and manipulation by the designer in the design process. The subsequent references to a concept pertain to both local and global concepts.

Returning to FIG. 2, step 2-4 is performed by the merit value monitor 5. In this step, merit values are maintained for concepts and attributes of the concepts. The merit values are important measures which are used to learn the tastes of the designer in order to yield more relevant profiles later in the genetic evolution. In the process of interacting with the designer, the present invention is able to learn and develop genes yielding profiles to the taste of the user. In order to learn efficiently, merit values are provided for each of the concepts and for each of their attributes. Details of the merit values and how they are maintained by the merit value monitor 5 in step 2-4 are discussed later.

The genetic evolution unit 6 performs step 2-5 to evolve the parent profiles to produce offspring profiles using a genetic algorithm that employs the above mentioned merit values. The genetic algorithm includes a probabilistic recombination algorithm which selects for each of the attributes at least one of a random value and a value of the attribute associated with one of the parent profiles depending on a non-linear importance function based on the merit values. The details of the genetic algorithm and its use of the merit values are discussed later.

Figure 7:
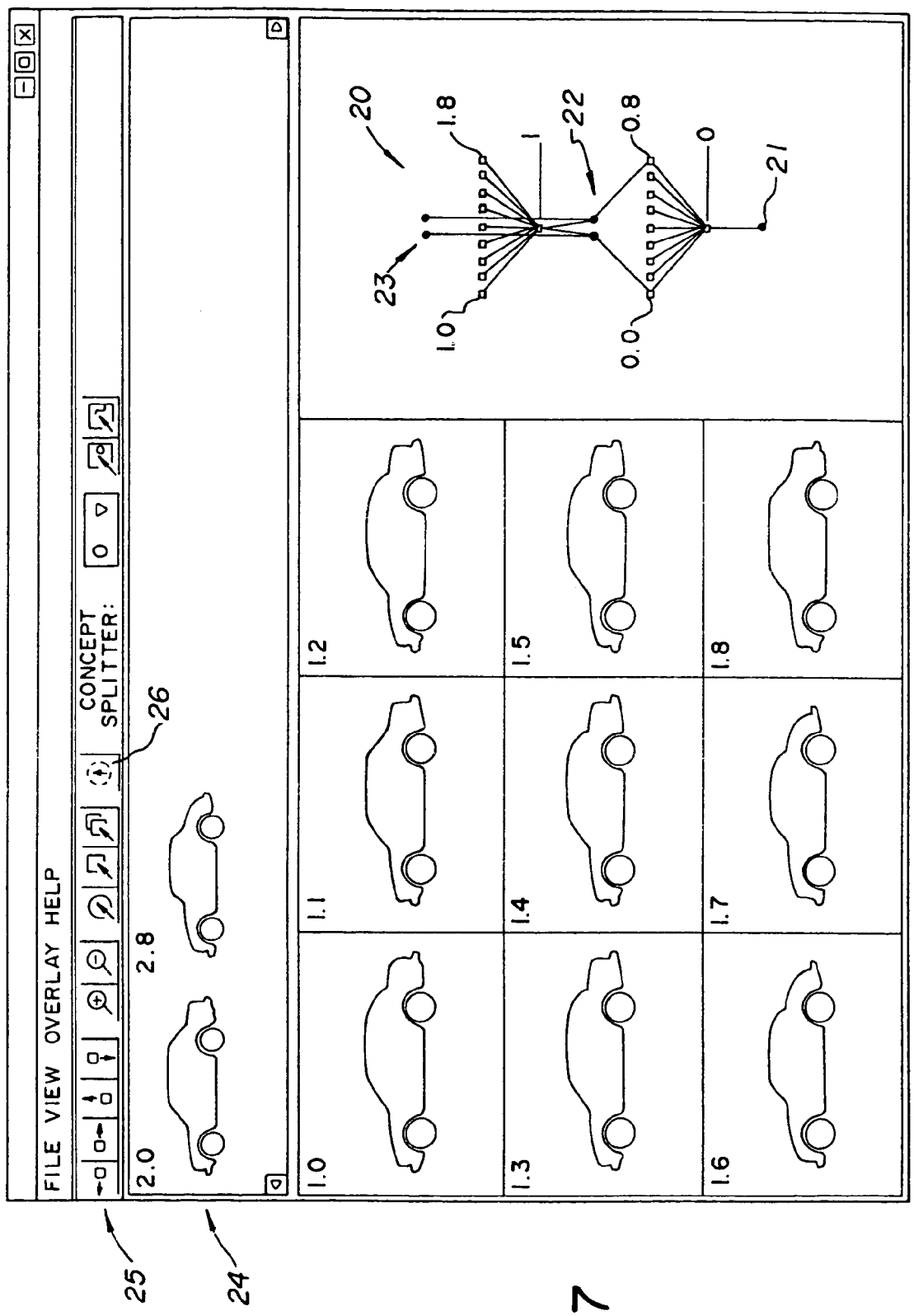
FIG. 7 shows a display of the parent profiles, offspring profiles, and a family tree.

FIG. 7 shows a sample output generated on the display 8 by step 2-7. A family tree 20 is generated by the family tree generator 7 in step 2-6. The family tree 20 reveals the lineage of genetic evolution of the profiles. By displaying the family tree alongside the parent and offspring profiles, the designer can better appreciate the history of the resulting profile and other design cycle logistics.

The family tree 20 shows two generations, 0 and 1. At the bottom of the tree, there is one progenitor parent 21 for generation 0. When there is only one parent profile, the genetic evolution unit randomly selects and varies attributes of local concepts of the profile to produce nine offsprings. Of course, the present invention is not limited to generating nine offsprings. Any desired number of offspring may be generated. Offsprings are designated by generation number and offspring number.

The family tree 20 shows that offsprings 0.0 and 0.8 from the nine offsprings 0.0 to 0.8 of generation 0 were previously selected as the parent profiles 22 for generation 1. The genetic evolution of parents 0.0 and 0.8 resulted in offsprings 1.0 to 1.8. The offsprings of the most recent cycle of evolution, i.e. offsprings 1.0 to 1.8, are displayed in the boxes next to the family tree.

Until new parents are selected for generation 2 from the offsprings 1.0 to 1.8, potential parents 23 for the next generation defaults to the same parents previously used and is displayed in the parent dock 24. The family tree 20 reflects this default choice with lines connecting the potential parents 23 of generation 2 to the previous parents 22 of generation 1.

Clicking on a displayed profile allows the user to edit the concepts and attributes of the concepts of the selected profile. A tool bar 25 is also provided with icons for various editing functions. Although not depicted, dialog menus are also available for designating specific attribute values. Icon 26 is the evolve icon for initiating the genetic evolution of the selected parent profiles.

Although the present invention has been described with reference to the design of automobiles, the present invention is equally applicable to the design of other physical structures, such as airplanes, ships, trains, toys, etc. that can be represented in a similar manner with the above local concepts including surface segments and glue segments.

Attribute modification, merit values, and the genetic algorithm of the preferred embodiment of the present invention will now be explained in detail in the following sections.

Modifying Attributes:

As mentioned above, the user can alter attributes through the profile editor 4 in step 2-3. On the other hand, some changes are generated automatically by the program. These changes should respect the setting learned for other parameters. To achieve this feature, curves are designed with encoded information on how much deviation an attribute can bear without conflicting with the intents expressed by the user in previous modifications.

Consider for instance the case of asymmetry. Asymmetry takes a value in [−1, 1]. Let l=−1 denote the left-most value and r=1 denote the right-most value. Consider the case of a specific concept c and assume that c's current asymmetry is a value $x_0 \in [-1, 1]$. Define the parameterized family of functions $f_{n,x0}$: [l, r]→[0,1], where n is a positive parameter:

$$f_{n,x0}(x) = \left(\frac{x-l}{x_0-l}\right)^n \text{ if } l \leq x \leq x_0, \text{ and}$$

$$= \left(\frac{r-x}{r-x_0}\right)^n \text{ if } x_0 \leq x \leq r.$$

Thus $f_{n,x0}$ is increasing on [l, $x_0$] and decreasing on [$x_0$,r], $f_{n,x0}(x_0)=1$, $f_{n,x0}(l)=f_{n,x0}(r)=0$. The parameter n controls the sharpness of the pick at $x_0$. A point x is at distance $dn(x,x_0)=\epsilon$ from $x_0$ if $f_{n,x0}(x)=\epsilon$.

In general each attribute c has a parameter $n_c$ that the algorithm adjusts during the execution of the program. The higher $n_c$ is, the tighter is the control on the value of c. The parameter $n_c$ is defined in terms of the merit values of the attribute c. Attributes with higher merit values have higher exponents n, allowing less movement around the current value.

Length adjustments will now be addressed. For every concept c let R(c) denote the concept on of the right of c, and L(c) the concept on the left of c. More generally, let $R^n(c)=R(R^{n-1}(c))$ denote the $n^{th}$ concept on the right of c. Similarly $L^n(c)=L(L^{n-1}(c))$ is the $n^{th}$ concept on the left of c. For every concept c, let $A_c$ denote the counter-clockwise extremity of c and $C_c$ the clockwise extremity of c. There are also two operators of concept-translation $T_{left}$ and $T_{right}$. For every point P and concept c, $T_{left}(P,c)$ translates the concept c in such a way that the extremity $A_c$ of c is positioned at P. Similarly, $T_{right}$ translates the concept c in such a way that the extremity $C_c$ of c is positioned at P.

Now assume that the user wants to change the length l(c) of concept c to a new value l', while not moving the left part $A_c$. The change proceeds as follows. First, the length of c is changed to the required value l' while not moving the left part $A_c$: by definition the extremity $C_c$ of the concept c is changed. Call c' the concept obtained after this modification of c. Then Left_Adjust is applied for ($C_{c'}$, R(c)) to ($C_{Rk-1(c')}$, $R^k(c)$).

For Left_Adjust($C_{c'}$, R(c)), first $T_{left}$ ($C_{c'}$, R(c)). This means translating the right-neighbor R(c) of c so that its left end, $A_{R(c)}$, is brought to the extremity $C_{c'}$ of c'. After translation, a right neighbor R(c') of c' is obtained. Second, change the angle c', R(c') and/or the length l(R(C')) to admissible values minimizing the distance d($C_{R(c')}$, $C_{R2}(c)$). Third, stop if the distance d($C_{R(c')}$,$C_{R2(c)}$) is zero.

By definition a new value of an attribute is admissible if it satisfies the various constrains imposed on that attribute. For instance, one must preserve the relation $d_a$ (old-value, new-value)$\leq \frac{1}{2}$, where $d_a$ is the distance dn defined above. If the attribute is an angle, a change is admissible only if it respects any constraint on the value absolute_angle_value that might exist.

The next Left_Adjust, i.e. Left_Adjust ($C_{R(c')}$, $R^2(c)$), is essentially the same as the above, except that c' is now R(c'), and R(C) is now R(R(c)) or $R^2(c)$. The next Left_Adjust would then be Left_Adjust ($C_{R2(c')}$, $R^3(c)$). Left_Adjust ($C_{Rk-1(c')}$, $R^k(c)$) proceeds until the distance d($C_{Rk-1(c')}$, $C_{Rk(c)}$) is brought to zero, or until all the concepts have been visited and d($C_{Rk-1(c')}$, $C_{Rk(c)}$) is not yet zero. In the latter case, output an exception.

Changing an angle attribute will now be addressed. The process for changing an angle attribute is absolutely similar to the one for changing a length. Assume that the user wants to change the angle of a concept c to a new value a', while not moving the concept on the left of the concept. First, change the concept so that the angle value is changed to the required value a'. Call c' the concept obtained after modification of c. Then, Left_Adjust ($C_{c'}$, R(c)), Left_Adjust ($C_{R(c')}$, $R^2(c)$), and proceed doing Left_Adjust ($C_{Rk-1(c')}$, $R^k(c)$) until the distance d($C_{Rk-1(c')}$, $C_{Rk(c)}$) is brought to zero.

Merit Values:

As mentioned above, the present invention maintains merit values in step 2-4 through the merit value monitor 5. The rationale for the merit values and how they are maintained are detailed as follows. The designer guides the algorithm in two ways. On the one hand, the user indicates to the program how he would like to modify specific designs. For instance, the designer might indicate that he wants to enlarge the greenhouse, or increase the angle between the windshield and the hood of a specific design. On the other hand, the designer selects at each phase some candidates of particular interest that he would like the algorithm to work with specifically. The results of this user/program interaction are encoded and summarized in the merit values. Merit values are numbers attached to concepts and to attributes of concepts. These numbers are updated during execution of the program and collectively represent the learned intentions of the user.

The following are several useful merit values: Concept_Age; Attribute_Age_user-defined; Attribute_Age_program-defined; Survival_Time; and Total_Modify_Time. For all these merit values, time is measured in terms of generations in the evolution of profiles. These merit values can be adjusted in terms of various parameters $\alpha_1$, $\alpha_2$, $\alpha_3$, $\alpha_4$, $\gamma_{Survival\_time}$ and $\gamma_{Modify\_time}$. The efficiency of the evolutionary algorithms will depend on judicious choices of these parameters.

Concept_Age:

The Concept_Age is a merit value of concepts, but not of attributes of concepts. The consideration of the Concept_Age is motivated by the fact that the population of concepts evolve, with concepts being born and some other disappearing. For instance, a bump might grow onto a hood, giving rise to a new concept. Conversely, the distinction between hood and windshield might vanish, (the two concepts becoming for instance aligned on a straight line), and be replaced by a single hood-windshield concept. As the execution proceeds, the existence of some concepts becomes confirmed, whereas the existence of some others becomes less necessary, opening up the possibility of their disappearance. The Concept_Age provides a measure of such phenomenon: older concepts, i.e., concepts with a larger Concept_Age value should be more stable and pertinent than more recent younger concepts.

The age of a concept is measured as follows. The first time (i.e., the first generation) a concept c appears, the concept is given Concept_Age 1. Specifically, if a profile p develops a concept c which neither of its parents had, then Concept_Age$_p$(c)=0.

On the other hand, if a profile p inherits a concept from one of its parents, $$\text{Concept\_Age}_p(c) = \max_{p';p' \in parents(p)} \text{Concept\_Age}_{p'}(c) + 1. \quad (1)$$

The Concept_Age can be extended to all profiles by setting Concept_Age$_p$(c)=−1 if the concept c is not part of the profile p. With this extension, formula (1) above holds in full generality.

Attributes_Age_user-defined:

Attribute_Age_user-defined is a merit value of attributes. It measures the time (in generations) that an attribute value set by the user lasts unchanged. This is useful for the following reason. If a user forces a change in a chosen profile, he most probably intends that this change is important for the next generation he has in mind. On the other hand, the fact that an attribute value has been kept for many generations is the sign that this value corresponds to the desire of the user.

For every attribute a of a concept c (e.g., the asymmetry of the hood), Attribute_Age_user-defined=0 when a is reset to a new value by the user using some icon. Attribute_Age_user-defined=* when a is reset to a new value by the program. If a is inherited from a parent p' for which Attribute_Age_user-defined$_{p'}$(a)≠* then:

$$\text{Attribute\_Age\_user} - \text{defined}_p(a) = \max_{p';p' \in parents(p)} \text{Attribute\_Age\_user} - \text{defined}_{p'}(a) + 1.$$

If $\alpha$ is inherited from parents p' which are all such Attribute_Age_user-defined$_{p'}$(a)=* then Attribute_Age_user-defined$_p$(a)=*.

Attribute_Age_program-defined:

Attribute_Age_program-defined is complementary to Attribute_Age_user-defined in that it measures the time (in generations) that an attribute value set by the program (not by the user) lasts unchanged. The two merit values are related through the following relation:

Attribute_Age_program-defined+Attribute_Age_user-defined=time_since_last_change.

For every attribute a of a concept c (e.g., the asymmetry of the hood), Attribute_Age_program-defined=0 when a is reset to a new value by the program. Attribute_Age_program-defined=* when a is reset to a new value by the user. If a is inherited from parents p' which are all such that: Attribute_Age_program-defined$_{p'}$($\alpha$)≠* then Attribute_Age_program-defined$_p$ $$(a) = \max_{p';p' \in parents(p)}$$

Attribute_Age_program-defined$_{p'}$(a)+1.

If $\alpha$ is inherited from at least one parent p' such that Attribute_Age_program-defined$_{p'}$(a)=*, then Attribute_Age_program-defined$_p$(a)=*.

Survival_Time:

Survival_Time involves three parameters: Survival_Time (c), $\alpha_1$, and $\alpha_2$. Survival_Time is a merit value of both attributes and concepts. This merit value is designed to capture the guidance given by the designer through icon dialog. The idea is that a concept, or a concept attribute, which stays unchanged while the user makes a series of changes is much more likely to fit the desires of the designer. If a concept or a concept attribute is not to the designer's liking, the designer would eventually make a change to it.

To implement this idea, for each concept c (resp. for each attribute c), and for each profile p having concept c (resp. having a concept with attribute c), Survival_Time(c) is defined and updated as follows. Here, $\gamma_{Survival\_}$time$\leq$1 is a fixed discount factor.

1. If the concept/attribute c did not exist in any of the parents of this profile p (i.e., if the concept/attribute is first created with p) then set Survival_Time(c)=1 at the time of this creation.

2. Otherwise, if p is created as one of the nine outputs of the Evolve procedure (discussed below), and if p inherits the concept/attribute c from one of its parents, then set at the time of this creation:

$$\text{Survival\_Time}(c) = \gamma_{Survival\_time} \max_{p';p' \in parents(p)} \text{Survival\_Time}_{p'}(c). \quad (2)$$

In this equation, Survival_Time$_{p'}$(c) is the merit value Survival_Time(c) derived from profile p'. The discounting term $\gamma_{Survival\_time}$ is used to formalize that the information extracted from recent survivals has more importance then older instances: older contributions decay with time at rate $\gamma_{Survival\_time}$. In a first implementation, $\gamma_{Survival\_}$time=1 can be taken.

3. There are cases where the concept/attribute c was previously made part of p (either through creation as in the first scenario above or through inheritance as in the second scenario above). Consider the case where the designer selects p as one of the two chosen profiles and uses the icon-menu to modify p in such a way that (a) the user selects a region of the profile p containing c, or (b) the user generates some modifications using the icon menu, which result in leaving the concept/attribute c unchanged. Two cases are distinguished.

First is the case when the icon-directed request of change is the first involving c in the current cycle. If the blow_up/shrink icon is used, then Survival_Time(c) is incremented by $\alpha_1$, where $\alpha_1$ is a constant less than 1. If the user used a dialog menu, then Survival_Time(c) is incremented by one.

Second is the case when the icon-directed request of change is not the first involving c in the current cycle. In this case, the procedure above for when the icon-directed request of change is the first involving c in the current cycle is followed, but multiply by $\alpha_2$, $\alpha_2 < 1$, for all the increments. The idea for scaling down the increments by a factor of $\alpha_2$ is that, as the user can only imperfectly express its intentions with icons, the user might have to play several times with the icons in a given cycle before translating his intentions with some satisfaction. In other words, the user might use icons repetitively during a cycle simply because of the interpretative limitations of the icons. On the other hand, the fact that the user refines a given concept at different cycles indicates a recurrent interest of the user for that concept.

4. If the user modifies c by generating changes with the icon menu, then Survival_time(c) is reset to 0.

Total_Modify Time:

The Total_Modify_Time involves three parameters: Total_Modify_Time(c), $\alpha_3$, and $\alpha_4$. Survival_Time(c) is useful to indicate how a concept or attribute is important because it was not changed. The merit value Total_Modify_Time(c) is useful to indicate how a concept or attribute is important because it was changed often. The rationale is that a concept or attribute is changed often only if the designer attaches special importance to this part of the profile. Here, $\gamma_{Modify\_time} \leq 1$ is another fixed discount factor.

1. If the concept/attribute c did not exist in any of the parents of p (i.e., if the concept/attribute is first created with p) then set at the time of this creation Total_Modify_Time(c)=1.

2. Otherwise, if p is created as one of the nine outputs of the Evolve procedure, and if p inherits the concept/attribute c from one of its parents, then set at the time of this creation $$\text{Total\_Modify\_Time}(c) = \gamma_{Modify\_time} \max_{p'; p' \in \text{parents}(p)} \text{Total\_Modify\_Time}_{p'}(c). \quad (3)$$

3. There are now left, as before, cases where c was already created and is part of a profile p. Assume that the user modifies p by selecting a region and using an icon, and that c gets consequently modified. Again, two cases are distinguished.

First is the case when the icon-directed request of change is the first involving c in the current cycle. If c is the concept or figure of merit that the user specifically requested to change, then Total_Modify_Time(c) is incremented by one. If c is affected through the blow_up/shrink icon, then c is incremented by α3, where α3 is a constant less than 1.

Second is the case when the icon-directed request of change is not the first involving c in the current cycle. If c is an attribute and if the request of change is in the opposite direction then a previous one, (e.g., the previous request was to decrease the value of c, and the current request is to increase it), then the procedures above for when the icon-directed request of change is the first of the current cycle is followed. Again, if c is an attribute, but if the request of change is in the same direction as the previous one, (e.g., the previous request was to decrease the value of c, and the current request is also to decrease it), then do not change Total_Modify_Time(c). If c is a concept, then change Total_Modify_Time(c) whenever an attribute of c is changed and by the same quantity the attribute is changed.

4. Total_Modify_Time(c) is never reset to 0. But if the concept c disappears Total_Modify_Time(c) becomes of course irrelevant and can be purged.

Genetic Evolution:

As mentioned above, the genetic evolution unit 6 applies a genetic algorithm using the merit values to evolve the parent profiles to produce offspring profiles (in step 2-5). A simple class of parameterized genetic evolutionary algorithms that act on the parent profiles will now be described.

Consider first the simple setting where the family of concepts does not change and is the same for all profiles. In this simple setting, new concepts are not allowed to appear, and concepts are not allowed to disappear or merge.

Let $(c_i)_{i \in I}$ be the family of concepts. For instance $c_1$ could be the windshield, $c_2$ the roof, etc. These concepts are organized in a hierarchical fashion: a database that accounts for them is built on top of a tree structure. Nevertheless, our first algorithm discards the tree structure and only considers leaf concepts, i.e., concepts with attributes. Furthermore, this first class of evolutionary algorithms act only on asymmetry and height. It does not allow changes to lengths and (relative) angles of concepts. Also, this class of algorithms acts on attributes independently. For a given concept, its height and asymmetry are selected independently. For every attribute a, let:

$A_u$ (a) denote the Attribute_Age_user-defined merit value of a;

$A_p$ (a) denote the Attribute_Age_program-defined merit value of a;

S(a) denote the Survival_time merit value of a; and

M(a) denote the Total_Modify_Time merit value of a.

The algorithm is a probabilistic recombination algorithm, which selects for each attribute a either a random value, or the value $a_j$ associated to one of the profiles already created. The probabilistic selection depends on the merit values $A_u(a_j)$, $A_p(a_j)$, $S(a_j)$, $M(a_j)$ of all existing profiles. A good selection process requires consideration of non-linear expressions in $A_u(a)$, $A_p(a)$, $S(a)$, $M(a)$.

Consider the case where the user selects a profile in a work window and sets an attribute a to a specific value with an icon. The value thus selected clearly has a lot of importance and should be treated with special consideration by the algorithm setting the value of a. In other words, the algorithm should pay special attention to values $a_j$ such that $A_u(a_j)=0$, i.e., values that have just been modified by the user.

Consider now a value $a_j$ with very high age $A_u(a_j)$. Having a high age, the value $a_j$ has survived a long time darwinian selection and presumably corresponds to the taste of the user. In other words, the algorithm should also pay special attention to values $a_j$ with high values $A_u(a_j)$. This shows that the selection process cannot act linearly on $A_u(a)$. To model the behavior just described, the importance function $\phi_u^{(1)}$ of A: $\phi^{(1)}(A(a_j))$ is introduced as a measure of the "importance" of an attribute $a_j$ as indicated by its age $A(a_j)$). The function $\phi^{(1)}$ has the following properties: $\max_A \phi_u^{(1)}(A) = \phi_u^{(1)}(0) = v_1$, where $v_1$ is the highest value of $\phi_u^{(1)}$; $\min_A \phi_u^{(1)} A = \phi_u^{(1)}(A_{low}) = v_2$, where $v_2$ is the lowest value of $\phi_u^{(1)}$ and $A_{low}$ is the value of A where that minimum is attained; and $\lim_{A \to \infty} \phi_u^{(1)}$ (A)=$v_3$, with $v_3$, $0<v_2<v_3<v_1$. A choice for such a function $\phi_u^{(1)}$ is:

$$\phi_u^{(1)}(A) = v_1 + (v_2 - v_1)\frac{A}{A_{low}} \quad \text{if } 0 \le A \le A_{low}$$

$$= v_2 + (v_3 - v_2)\frac{A - A_{low}}{A - A_{low} + 1} \quad \text{if } A_{low} \le A \le \infty, \text{ and}$$

$$\phi_u^{(1)}(*) = 0 \quad \text{with } A_{low} = 3.$$

Thus $\phi_u^{(1)}(A)$ is (locally) maximized for A=0 and for A big. Values with medium level ages $a_j$ ($a_j$ around 3) are given a lower level $\phi_u^{(1)}(A(a_j))$.

Consider now the case where the user expresses a strong attachment to a value $a_j$. This happens in particular when the user, after having selected (with an icon) a first time $a_j$, and after having seen it modified by the (unruly) program, reinstates the value $a_j$. In such cases where the user indicates his attachment to a value $a_j$, this value should ideally retain importance, even as it ages. In particular, the loss of importance at 3 shown by $\phi_u^{(1)}$ is inappropriate in such cases. To account for such situations, another important function $\phi_u^{(2)}$ is introduced:

$$\phi_u^{(2)}(A) = v_3 + \frac{2(v_1 - v_3)}{A + 1} \quad \text{for } 0 \le A, \text{ and}$$

$$\phi_u^{(2)}(*) = 0.$$

Thus $\phi_u^{(2)}(0) = v_1 + (v_1 - v_3)$ is higher then $\phi_u^{(1)}(0) = v_1$. Also, the importance $\phi_u^{(2)}(A)$ decreases with the age A and tends to $\phi_u^{(2)}(\infty) = v_3 = \phi_u^{(1)}(\infty)$. If a value survives a very long time, its importance is independent of the original emphasis put by the user. The use of $\phi_u^{(2)}$ in this situation appropriately accounts for the fact that, if the user requests a second time the value $a_j$, the importance of that value must be higher.

Consider now the update of the importance function used to evaluate the age A(a) of an attribute a. Which of the two importance functions $\phi_u^{(2)}$ and $\phi_u^{(1)}$ should be used at a given time to evaluate the value $a_j$ of an attribute a? The following algorithm answers this question.

To simplify, let a also denote the value of an attribute a and let [l, r] denote the interval within a ranges. For instance, if a is an asymmetry attribute, then l=−1 and r=1. Let last_user_choice denote the most recent (measured in generations) value the user selected for a. Initially, let last_user_choice=*. When A(a)=0, i.e. when the user resets the value a to some new_user_choice, if |last_user_choice−new_user_choice|≦0.1(r−1), then $\phi_u = \phi_u^{(2)}$, else $\phi_u = \phi_u^{(1)}$.

As another evolutionary algorithm, consider now the genetic algorithm to select the best and mutate the rest. For every attribute a, e.g. for the a=height(roof), let $(a_j)_j$ be the family of values taken by a over all existing profiles, e.g. the collection of all values for height(roof), one for each profile. Let ε>0 be a threshold, and $\beta_1$ to $\beta_4$ be parameters. Let $W(a_j) = \beta_1 \phi_u(A_u(a_j)) + \beta_2 \phi_p(A_p(a_j)) + \beta_3 S(a_j) + \beta_4 M(a_j)$. A value $a_j$ is called admissible if $W(a_j) \ge \epsilon$. If the set of admissible values is not empty, select among them a value $a_j$ with probability $$\frac{1}{K}W(a_j)$$

where $$K = \sum_{\text{admissible } aj} W(a_j)$$

is the normalization constant required to have probabilities. If the set of admissible values is empty, return a random new value. This random value can be drawn according to various probability laws. Let $a_0$ denote the current value. A first choice is to select a new value a with probability law $1/K f_{1,a0}(a)$, where $f_{1,a0}$ is the function $f_{n,x0}$ defined above, and where K is a normalizing constant.

Now consider an evolutionary algorithm in the case where $\beta_2 = \beta_3 = \beta_4 = 0$. In this case, the algorithm puts an emphasis in selecting attribute values that have been changed by the user either recently or a long time ago. For instance, taking $v_1 = 4$, $v_2 = 3$, and $v_3 = 1$ yields:

$$\phi_u^{(1)}(A) = 4 + .664 \quad \text{if } 0 \le A \le 3$$

$$= 3 + 2\frac{A - 3}{A - 2} \quad \text{if } 3 \le A \le \infty, \text{ and}$$

$$= 0 \quad \text{if } A = *.$$

As described above in detail, the present invention provides a genetic design method and apparatus in which desired profiles are broken down into concepts, including the local concepts of surface segments and glue segments, and a genetic algorithm is used to evolve parent profiles to produce offspring profiles based on merit values of the concepts. The genetic algorithm includes a probabilistic recombination algorithm which selects for each of the attributes of the concepts at least one of a random value and a value of the attribute associated with one of the parent profiles depending on a non-linear importance function based on the merit values.

By decomposing profiles into segments and evolving such profiles, the present invention can enrich the design process with meaningful offspring profiles reflecting various combinations of preferred characteristics of the parent profiles. This facilitates quick and easy generation of creative concept variations and reduces the overall design time.

Profiles according to the present invention can be easily modified, while maintaining relevant information on the designer's preferences. The combination of the merit values, as represented by the non-linear importance function, reflects the preferences of the designer as the design progresses through various modifications and generations of evolution. Accordingly, the present invention is able to "learn" what is important to the designer as the concept undergoes changes, and the present invention can maintain preferred features across successive generations of the profiles. As such, the genetic design method and apparatus of the present invention enriches the design process with meaningful offspring profiles embodying preferred attributes from prior generations.

Although preferred embodiments of the present invention have been described, it would be appreciated by those skilled in the art that changes may be made in these embodiments without departing from the principles and spirit of the invention, the scope of which is defined in the claims and their equivalents.

What is claimed is:

1. A graphical user interface for generating a visual display to facilitate design and modeling of an automobile, comprising:
   a display screen;
   a processor to generate an output on the display screen; and
   a user actuable controller to select outputs on the display screen in a design process,
   wherein the processor generates a display of a parent profile representing an outline for design, the outline delineating a shape of the automobile, the parent profile including segments, each of the segments having at least one dimensional characteristic, an icon for selecting at least one segment of the segments, and an icon for evolving the parent profile, and
   wherein, in response to the user selecting the at least one segment by selecting the icon for selecting with the user actuable controller, the processor modifies the at least one dimensional characteristic of the at least one segment to produce a modified segment, and causes the display to display the modified segment, and
   wherein, in response to the user selecting the icon for evolving the parent profile with the user actuable controller, the processor performs evolving of the parent profile using a genetic algorithm to produce an offspring profile, the evolving including evolving the modified segment, the offspring profile representing a new outline for the design, the new outline delineating a new shape of the automobile, and causes the display to display the new outline for the design.

2. A graphical user interface as claimed in claim 1, wherein the segments of the profiles represent curves and lines of contours of externally visible components of the automobile.

3. A graphical user interface as claimed in claim 1, wherein at least one of the profiles includes at least one dimensional characteristic pertaining to the overall profile.

4. A graphical user interface as claimed in claim 1, wherein at least one of the profiles includes different levels of detail.

5. A graphical user interface as claimed in claim 1, wherein at least one of the profiles includes a grouping of the segments that represents a component of the automobile.

6. A graphical user interface as claimed in claim 1, wherein at least one of the profiles includes a grouping of the segments that represents a component of the automobile, the grouping including at least one dimensional characteristic pertaining to the grouping.

7. A graphical user interface as claimed in claim 1, wherein at least one of the profiles includes at least two groupings of the segments that respectively represent at least two components of the automobile, the profile including a relational parameter pertaining to a relationship between the at least two groupings.

8. A graphical user interface as claimed in claim 1, wherein at least one of the profiles includes a relationship between at least two of the segments, the relationship including a radius parameter.

9. A graphical user interface as claimed in claim 1, wherein the display displays the offspring profile.

10. A graphical user interface as claimed in claim 1, wherein the display simultaneously displays the parent and offspring profiles.

11. A graphical user interface as claimed in claim 1, wherein the display displays a family tree identifying successive generations of the parent and offspring profiles.

12. A graphical user interface as claimed in claim 1, wherein the display simultaneously displays the parent profile, the offspring profile, and a family tree identifying successive generations of the parent and offspring profiles.

13. A graphical user interface as claimed in claim 1, wherein the display is a three-dimensional display displaying at least one of the profiles as a three-dimensional image.

14. A graphical user interface as claimed in claim 1, further comprising a profile editor to specify or modify the at least one dimensional characteristic for at least one of the segments.

15. A graphical user interface as claimed in claim 1, further comprising a profile editor to modify at least one of the profiles to identify a grouping of the segments that represents a component of the automobile.

16. A graphical user interface as claimed in claim 1, further comprising:
   a profile editor to modify at least one of the profiles to identify a grouping of the segments that represents a component of the automobile, and to specify or modify at least one dimensional characteristic pertaining to the grouping.

17. A graphical user interface as claimed in claim 1, further comprising:
   a profile editor to modify at least one of the profiles to identify at least two groupings of the segments that respectively represent at least two components of the automobile, and to specify or modify a relational parameter pertaining to a relationship between the at least two groupings.

18. A graphical user interface as claimed in claim 1, further comprising a profile editor to isolate at least one of the segments of the parent profile from evolving.

19. A graphical user interface as claimed in claim 1, further comprising a profile editor to select at least one of the segments specifically for evolving.

20. A graphical user interface as claimed in claim 1,
   wherein the parent profile includes at least two groupings of the segments that respectively represent at least two components of the automobile, and
   further comprising a profile editor to select one of the two groupings specifically for evolving.

21. A graphical user interface as claimed in claim 1, further comprising a profile editor to specify a user preference to keep at least one of the segments unchanged during the evolving.

22. A graphical user interface as claimed in claim 3, further comprising a profile editor to specify or modify the at least one dimensional characteristic pertaining to the overall profile.

23. A graphical user interface as claimed in claim 3, further comprising a profile editor to isolate the at least one dimensional characteristic pertaining to the overall profile from evolving.

24. A graphical user interface as claimed in claim 4, wherein the display displays at least one of the profiles at one of the different levels of detail.

25. A graphical user interface as claimed in claim 5, wherein the display displays the grouping.

26. A graphical user interface as claimed in claim 5, wherein the display includes a first window displaying at least one of the profiles and a second window displaying the grouping.

27. A graphical user interface as claimed in claim 5,
   wherein the grouping is part of the parent profile, and
   further comprising a profile editor to isolate the grouping from evolving.

28. A graphical user interface as claimed in claim 5, further comprising a profile editor to specify a user preference to keep the grouping unchanged during the evolving.

29. A graphical user interface as claimed in claim 6,
wherein the grouping is part of the parent profile, and
wherein the genetic algorithm evolves the at least one dimensional characteristic pertaining to the grouping.

30. A graphical user interface as claimed in claim 7,
wherein the at least two groupings are part of the parent profile, and
wherein the genetic algorithm evolves the relational parameter pertaining to the relationship between the at least two groupings.

31. A graphical user interface as claimed in claim 8, further comprising a profile editor to specify or modify the relationship between the at least two segments.

32. A graphical user interface as claimed in claim 8,
wherein the relationship between the at least two segments is part of the parent profile, and
wherein the genetic algorithm evolves the relationship between the at least two of the segments.

33. In a computer system having a user interface including a display and a selection device, a method of designing an automobile with the display and selection device, comprising:

displaying on the display a parent profile representing an outline of the automobile, the outline delineating a shape of the automobile, the profile including plural segments, each of the segments having at least one dimensional characteristic;

receiving a selection signal from the selection device, the selection signal indicating selection of at least one segment of the plural segments;

modifying the at least one dimensional characteristic of the selected at least one segment in response to the selection signal;

displaying on the display the modified selected at least one segment;

receiving a selection signal from the selection device, the selection signal indicating selection of an icon for evolving the parent profile using a genetic algorithm to produce an offspring profile, the evolving including evolving the modified at least one dimensional characteristic of the selected at least one segment, the offspring profile representing a new shape of the automobile; and displaying on the display the offspring profile representing the new shape of the automobile.

\* \* \* \* \*